(12) United States Patent
Morenko

(10) Patent No.: US 8,353,166 B2
(45) Date of Patent: Jan. 15, 2013

(54) GAS TURBINE COMBUSTOR AND FUEL MANIFOLD MOUNTING ARRANGEMENT

(75) Inventor: Oleg Morenko, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1669 days.

(21) Appl. No.: 11/465,655

(22) Filed: Aug. 18, 2006

(65) Prior Publication Data
US 2010/0281881 A1 Nov. 11, 2010

(51) Int. Cl.
F02C 7/20 (2006.01)
(52) U.S. Cl. .......................................... 60/799; 60/739
(58) Field of Classification Search .................... 60/739, 60/752, 796, 799–800
See application file for complete search history.

(56) References Cited

U.S. PATENT DOCUMENTS

| | | | |
|---|---|---|---|
| 1,081,950 A | 12/1913 | Eller | |
| 2,151,540 A | 3/1939 | Varga | |
| 2,443,373 A | 6/1948 | Borsoff | |
| 2,946,185 A | 7/1960 | Bayer | |
| 3,213,523 A | 10/1965 | Boehler | |
| 3,472,025 A | 10/1969 | Simmons et al. | |
| 4,100,733 A | 7/1978 | Streibel et al. | |
| 4,322,945 A | 4/1982 | Peterson et al. | |
| 4,327,547 A | 5/1982 | Hughes et al. | |
| 4,332,626 A | 6/1982 | Hood et al. | |
| 4,377,420 A | 3/1983 | Granatek et al. | |
| 4,404,806 A | 9/1983 | Bell, III et al. | |
| 4,409,791 A * | 10/1983 | Jourdain et al. | 60/240 |
| 4,472,133 A | 9/1984 | Petersen et al. | |
| 4,483,137 A * | 11/1984 | Faulkner | 60/39.55 |
| 4,703,888 A | 11/1987 | Kawamura et al. | |
| 4,870,943 A | 10/1989 | Bradley et al. | |
| 5,036,657 A | 8/1991 | Seto et al. | |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A * | 6/1998 | Hansel et al. | 60/739 |
| 5,797,266 A | 8/1998 | Brocard et al. | |
| 5,848,525 A | 12/1998 | Spencer | |
| 5,938,402 A | 8/1999 | Bochud et al. | |
| 5,944,483 A | 8/1999 | Beck et al. | |
| 5,956,955 A | 9/1999 | Schmid | |
| 5,983,642 A | 11/1999 | Parker et al. | |

(Continued)

FOREIGN PATENT DOCUMENTS

CA 1013153 7/1977

(Continued)

Primary Examiner — Phutthiwat Wongwian
(74) Attorney, Agent, or Firm — Norton Rose Canada LLP

(57) ABSTRACT

A mounting system for locating a combustor and a fuel manifold of a gas turbine engine within a gas generator casing thereof is described. The mounting system comprises at least three support pin assemblies which extend radially inwardly from the gas generator casing. The support pin assemblies support both the fuel manifold and at least an upstream end of the combustor and maintaining engagement between the fuel manifold and the combustor during operation of the gas turbine engine.

20 Claims, 4 Drawing Sheets

U.S. PATENT DOCUMENTS

| | | | |
|---|---|---|---|
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 * | 7/2001 | Sampath et al. | 60/740 |
| 6,463,739 B1 | 10/2002 | Mueller et al. | |
| 6,503,334 B2 | 1/2003 | Ruiz et al. | |
| 6,712,080 B1 | 3/2004 | Handschuh et al. | |
| 6,761,035 B1 | 7/2004 | Mueller | |
| 2003/0014979 A1 * | 1/2003 | Summerfield et al. | 60/776 |
| 2006/0218925 A1 * | 10/2006 | Prociw et al. | 60/739 |
| 2008/0016869 A1 * | 1/2008 | Fish et al. | 60/739 |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

* cited by examiner

GAS TURBINE COMBUSTOR AND FUEL MANIFOLD MOUNTING ARRANGEMENT

TECHNICAL FIELD

The technical field relates generally to an internal fuel manifold for a gas turbine engine.

BACKGROUND OF THE ART

Gas turbine engine internal fuel manifolds are typically located inside the engine case adjacent the engine combustor, and thus reside in an extremely hot environment. As is typical with other hardware mounted inside a gas turbine engine, complex connections are required to allow for thermal expansion and accommodate mismatches in thermal expansion which may exist between components made of different materials and/or which are exposed to different environmental temperatures. Complex systems are more difficult to make and assemble, and tend to add weight and cost. Additionally, when internal fuel manifolds are used, both combustors and their associated fuel systems which include such fuel manifolds are typically mounted within a surrounding casing by separate and independent sets of mounting hardware, each of which has to be accurately aligned and located, both relative to each other and relative to the casing and other engine components. Therefore, there is a continuing need to provide improvements to gas turbine combustor and fuel manifolds, particularly with respect to their mounting systems.

SUMMARY OF THE INVENTION

It is an object of the present invention to provide an improved mounting system for an internal fuel manifold of a gas turbine engine.

There is therefore provided, in accordance with one aspect of the present invention, a combustor assembly for a gas turbine engine comprising an annular internal fuel manifold mounted to a combustor within the gas turbine engine by a common mounting system, the fuel manifold having at least one fuel conveying passage therein in fluid flow communication with a plurality of fuel injection nozzles disposed about the fuel manifold and adapted to spray fuel into the combustor, the mounting system supporting both the fuel manifold and the combustor within a surrounding gas generator casing such that the combustor is rigidly supported within the gas generator casing in an axial direction, the mounting system permitting relative radial displacement between the fuel manifold and the combustor such as to absorb any radial thermal growth differential therebetween, and thereby maintaining the fuel manifold in engaged alignment with the combustor during operation of the gas turbine engine.

There is further provided, in accordance with another aspect of the present invention, a mounting system for locating a combustor and a fuel manifold of a gas turbine engine within a gas generator casing thereof, the mounting system comprising at least three support pin assemblies which extend radially inwardly from the gas generator casing, the support pin assemblies supporting both the fuel manifold and at least an upstream end of the combustor and maintaining engagement between the fuel manifold and the combustor during operation of the gas turbine engine.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
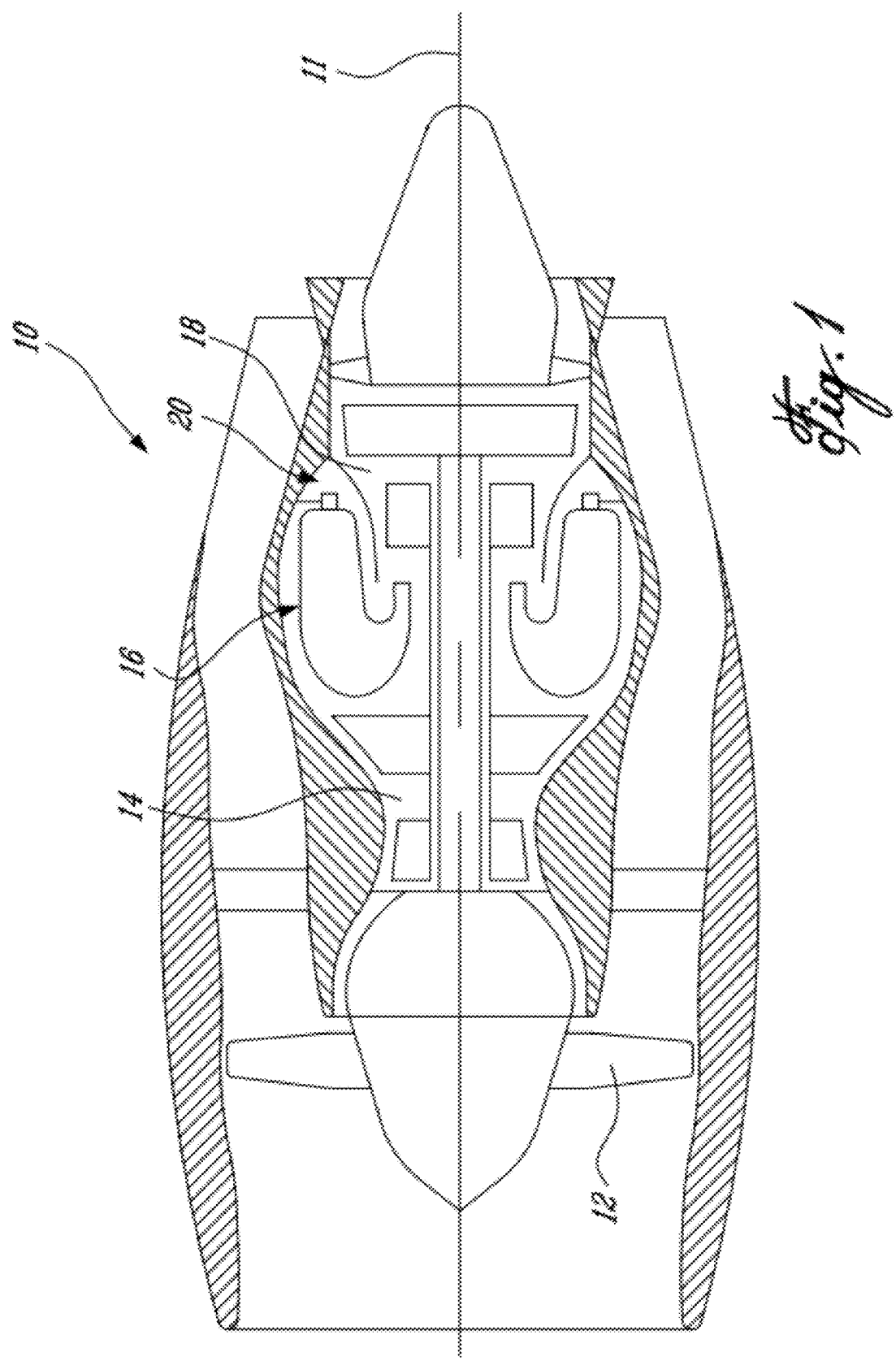
FIG. 1 is schematic cross-sectional view of a gas turbine engine.
Figure 2:
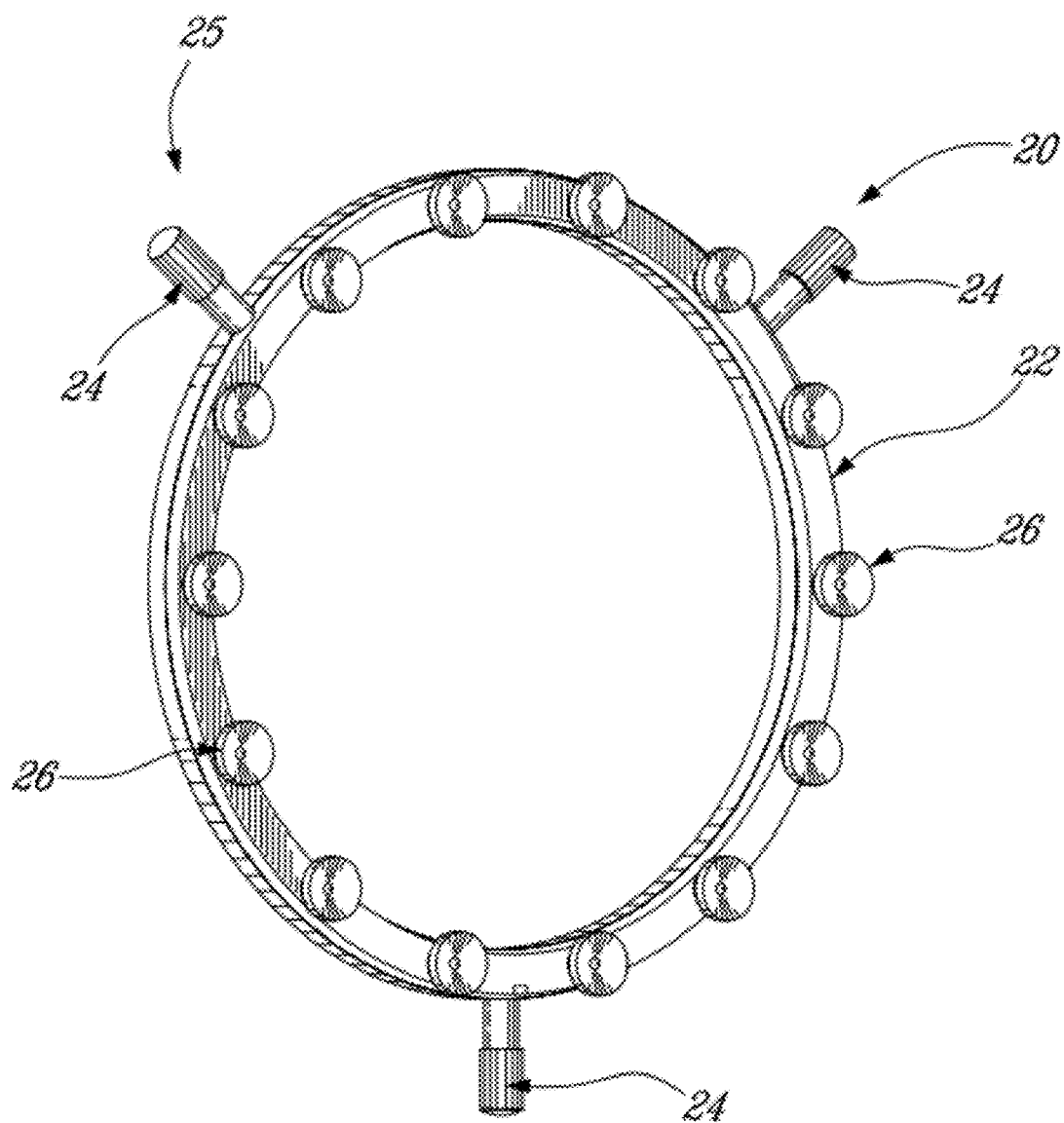
FIG. 2 is a perspective view of an internal fuel manifold incorporating a mounting system in accordance with the present invention, for use in a gas turbine engine such as that depicted in FIG. 1.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture. The fan 12, compressor 14, combustor 16, and turbine 18 are preferably all concentric about a common central longitudinal axis 11 of the gas turbine engine 10.

The fuel injection system 20 includes at least one fuel conveying member through which fuel flows. The fuel injection system includes an internal fuel manifold ring 22 which is mounted in conjunction with the combustor 16 within a surrounding casing of the gas turbine engine 10 by a mounting system, as will be described in further detail below. A plurality of fuel injecting nozzle assemblies 26 are provided about the circumference of the fuel manifold ring 22. The fuel nozzle assemblies 26 atomize the fuel as it is injected into the combustor for ignition when mixed with the compressed air therein. Fuel enters the annular fuel manifold ring 22 via at least one fuel inlet, which as described below is preferably integrated within one of the mounting pin assemblies of the mounting system as described below, and is distributed within the manifold ring 22 such that fuel flow is provided to each of the fuel nozzles assemblies. Both the fuel manifold ring 22 and the fuel injecting nozzle assemblies 26 comprise fuel conveying members.

Figure 3:
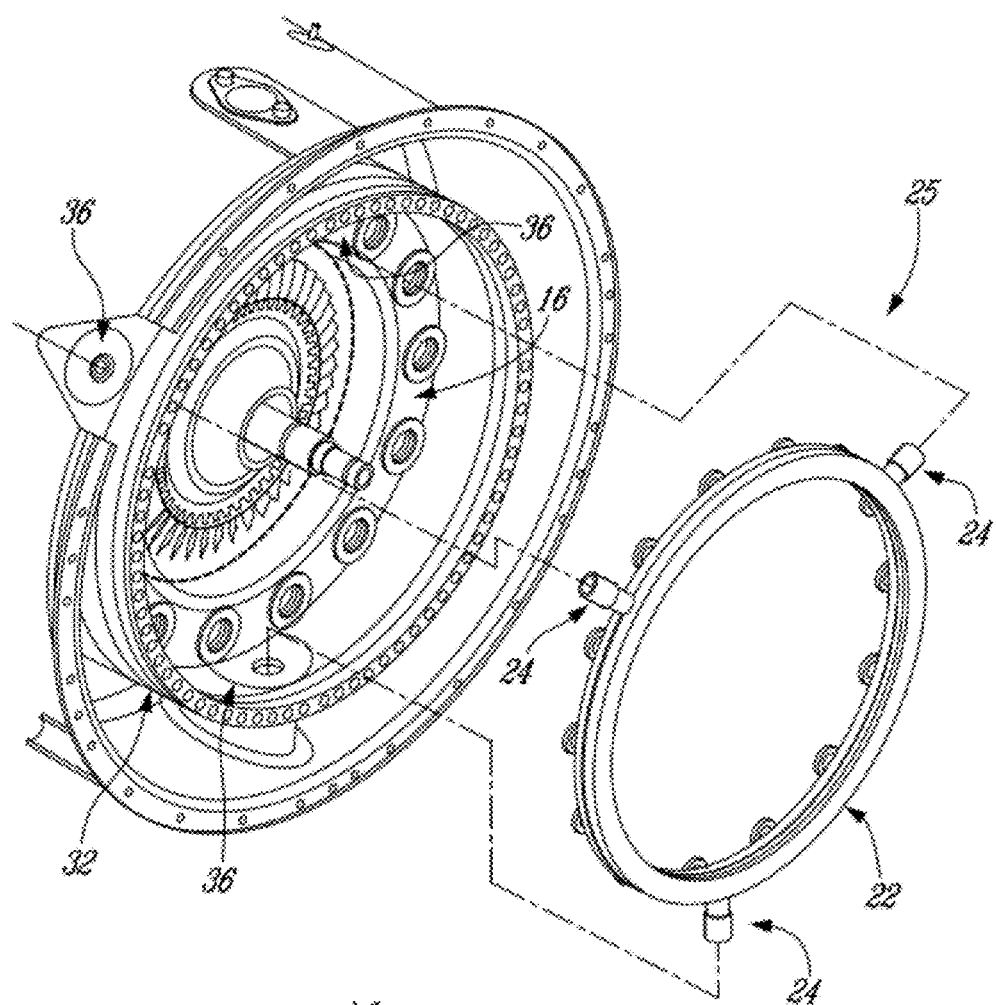
FIG. 3 is an exploded perspective view of a portion of a gas turbine assembly including the fuel manifold of FIG. 2 incorporating a mounting system in accordance with the present invention.

Referring to FIG. 3, the fuel manifold ring 22 is installed within a gas generator case 32 of gas turbine engine 10 by a mounting system 25 which supports and positions the fuel manifold 22 relative to the combustor 16 within the gas generator case 32. The mounting system 25 includes at least three supports which each comprise a pin support assembly 24, as will be described further below with reference to FIG. 4. The three pin support assemblies 24 are preferably equally spaced apart about the annular fuel manifold 22. The pin support assemblies 24 radially extend outward therefrom and are engaged at their radially outer ends to mating bosses 36 in the surrounding gas generator casing 32. As will be described further below, a portion of each pin support assembly 24 is fastened to the corresponding boss 36 of the casing 32, however the pin support assemblies 24 nonetheless permit radial displacement of the fuel manifold 22 within the gas generator casing 32. As such, radial growth between the fuel manifold and the surrounding case is accommodated. Additionally, the pin support assemblies 24 of the mounting system 25 also serve to support and located the combustor 16 itself within the gas generator casing 32. Axial and radial loads for supporting both for the fuel manifold ring 22 as well as the combustor 16 are therefore borne by the pin support assemblies 24 of the mounting system 25. At least one of the pin support assemblies 24 also provides a fuel inlet to the fuel manifold 22. Accordingly, the pin support assemblies 24 of the mounting system 25 provide a shared mounting system and locating device for both the fuel manifold and the combustor, such that the manifold will always be properly positioned, and maintained during engine operation, relative to the combustor regardless of the thermal growth differential and/or dimensional "stack-up" combinations therebetween.

The terms radial and axial loads as used herein are understood to mean loads which the supports must bear in the radial and axial directions (relative to the engine axis 11) in order to adequately support the fuel manifold and/or the combustor in a correct position within the surrounding casing.

In one embodiment, three pin support assemblies 24 are substantially equally spaced about the circumference of the annular fuel manifold 22 (i.e. they are spaced about 120 degrees apart), such as to define a Y-shaped support configuration. This configuration helps balance radial and axial loads between the three support points of the support system 25. Although other configurations are of course possible, in the embodiment depicted in FIG. 3, one support pin assembly 24 is located at the bottom or lower most point (i.e. the 6 o'clock position) of the annular fuel manifold 22 (when the engine is horizontal, such as when the engine is disposed in an normal flight attitude position for example, as shown in FIG. 1), and the two other pin support assemblies 24 are each disposed on the upper portion of the annular manifold about 120 degrees from the lower pin support assembly and from each other, at the 10 o'clock and 2 o'clock positions.

Figure 4:
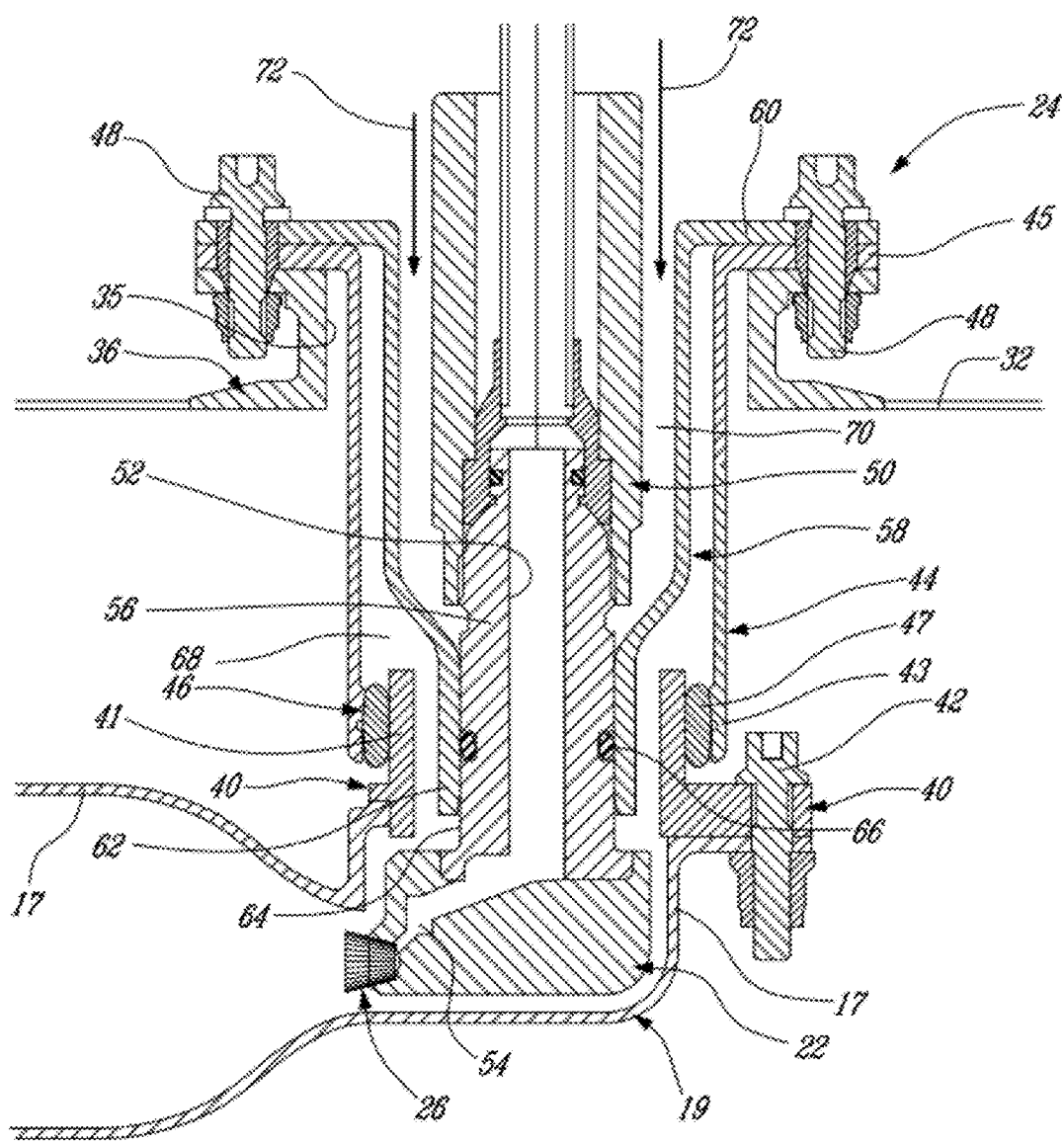
FIG. 4 is a cross-sectional view of a mounting pin assembly of the mounting system in accordance with the present invention.

Referring now to FIG. 4, a pin support assembly 24 of the support system 25 is shown in greater detail. The pin support assembly 24 includes a combustor mounting flange 40 which is fastened to an upstream end 19 of the liner 17 of the combustor 16 which is formed at this upstream end 19 such that the annular fuel manifold 22 is at least partially received therein. Alternately, the fuel manifold 22 is not received within the combustor liner 17, but rather includes a heat shield which encloses the fuel manifold and engages the combustor liner 17 at its upstream end. In the embodiment depicted, the annular upstream end 19 of the combustor liner 17 is formed such that the fuel manifold 22 is completely received therein in a manner that permits the fuel nozzle assemblies 26 protruding from the fuel manifold 22 to be aligned and extending into the combustor 16 for injection of fuel and/or a fuel/air mixture therein. The combustor mounting flange 40 is fastened to the combustor 16 by a plurality of suitable fasteners 42, such as for example a plurality of bolts which extend around the annular combustor mounting flange 40. However, other suitable fasteners can of course be used, such as rivets, welds, etc. The combustor mounting flange 40 therefore supports at least the upstream end 19 of the combustor within the engine, and more particularly within the gas generator casing 32. The combustor is, in at least one embodiment, only supported by the combustor mounting flange 40 at its upstream end 19, and by its engagement with the high pressure turbine (HPT) vane ring assembly (not shown) at the downstream end of the combustor 16 (i.e. no other mounting/locating pins are used other than the pin support assemblies 24).

The combustor mounting flange 40 is supported and located within the gas generator casing by a first, or outer, support tube 44 which extends radially inwardly from the surrounding gas generator case 32. More specifically, the first support tube 44 has an outer end 45 which is received within an opening 35 of a boss 36 of the gas generator case 32 and with which it is fastened thereto by several boss fasteners 48. An inner end 43 of the first support tube 44 is engaged with a cylindrical portion 41 of the combustor mounting flange 40 via an angularly compliant joint 46. The joint 46 preferably absorbs any misalignment between the first support tube 44 and the boss 36 of the combustor, and therefore between the gas generator casing 32 and the combustor therewithin. Therefore, if the combustor 16 is slightly non-concentric within the gas generator casing 32, or is slightly skewed therein relative to the main engine axis 11, the angularly compliant joint 46 allows such misalignments to be accommodated while nevertheless maintaining the combustor securely within the surrounding casing. As the position of the fuel manifold 22 relative to the combustor is maintained by the pin support assembly 24 which supports and locates both components, no misalignment therebetween is possible. The angularly compliant joint 46 includes, in at least one embodiment, a tubular element 47 having convex side walls such as to create a spherical-like bearing element between the cylindrical portion 41 of the combustor mounting flange 40 and the inner end 43 of the first support tube 44.

Within a center of the hollow first support tube 44 extends a fuel inlet tube 50 having a fuel flow passage 52 therein which provides fuel flow communication between a fuel source (not shown) and the fuel conveying passage(s) 54 of the fuel manifold 22. The fuel inlet tube 50 may be either a multiple-part tube as shown in FIG. 4, wherein an inner portion remains fastened to the fuel manifold 22 and an outer portion 56 is removably engaged to the inner portion, or alternately a single uninterrupted tube extending the length of the first support tube 44. Regardless, the fuel inlet 50 is supported and centrally located within the first support tube 44 by a second, or inner, support tube 58. Much as per the surrounding and concentric first support tube 44, the second support tube 58 has an outer end 60 which includes a flange that is fastened to the boss 36 of the gas generator case 32 by the same boss fasteners 48 and has an inner end 62 which engages the outer surface 64 of the fuel inlet 50 at a point thereon proximate the inner end thereof.

The inner end 62 of the second support tube 58 is however engaged with the outer surface 64 of the fuel inlet 50 such that relative radial sliding displacement therebetween is possible. In the embodiment shown the inner end 62 of the second support tube 58 is a biased against circumferential outer surface 64 of the fuel inlet 50, however the fuel inlet 50 is free to slide in a radial direction (relative to the main engine axis 11) substantially concentrically within the mating second support tube within which it is received. Accordingly, while the axial position (relative to the main engine axis 11) of the combustor 16, which is engaged with the first support tube 44, relative to the fuel manifold 22, which is engaged to the fuel inlet 50 located and supported by the second support tube 58, remains substantially unchanged during engine operation, this radial sliding arrangement permits the combustor 16 to grow radially without causing any misalignment and/or leakages caused by any thermal growth differential. A sealing member 66 is provided between the inner end 62 of the second support tube 58 and outer surface 64 of the fuel inlet 50, and may include for example an O-ring or other suitable sealing element. The sealing member 66 helps to prevent air leakage from the gas generator. The second support tube 58 has a diameter which is less than that of the surrounding first support tube 44, and preferably is sufficiently less to define an annular air gap 68 therebetween along at least a portion of the lengths thereof. This gap 68 provides an air gap between the first and second support tubes 44, 58, which helps keep the inner fuel inlet 50 cool. To further ensure that the fuel inlet 50 is kept cool (i.e. to reduce the heat transfer between the relative hot environment surrounding the combustor within which the pin support assemblies 24 extend), cool airflow (such as that depicted by arrows 72 in FIG. 4) may also be directed into an annular air passage 70, which is defined within the second support tube 58 and the fuel inlet 50 along at least a portion of their lengths and receives therein cooling airflow from a suitable cooling air source, such as to further cool the fuel within the fuel inlet passage 52 of the fuel inlet 50. The concentric first and second support tubes 44 and 58 are thus spaced apart from each other and from the fuel inlet 50 that extends through the center thereof, and thus together provide a double heat shield arrangement for the fuel inlet 50 which thermally insulates the fuel inlet. The first and second support tubes 44 and 58 which surround the fuel inlet 50 also help to protect it from any possible mechanical and/or foreign object damage (FOD), such as that which could occur from a bird strike, for example.

Accordingly, by using the mounting system 25 comprising at least three equally spaced apart pin mounting assemblies 24 as described, both the combustor 16 and the fuel manifold 22 used for injecting fuel and/or air therein are supported by common mounting points within the surrounding gas generator casing 32 of the engine 10. This eliminates the cost and complexities typically required when separate pins and other mounting elements are used to locate and support the combustor and the fuel manifold within the gas generator portion of the engine. Additionally, the pin mounting assemblies 24 of the present invention allow for radial growth of the combustor without causing problems in the junction between the fuel nozzles of the fuel manifold and the combustor due to thermal growth mismatch, permit absorption of angular misalignment between the combustor and the gas generator casing, as well as providing good thermal insulation between the fuel inlet and the hot environment surrounding the combustor. The pin mounting assemblies 24 also render the installation and assembly of the engine significantly simpler, as their ability to accommodate misalignments between the combustor and the surrounding casing permits the more rapid installation thereof in comparison with traditionally mounted combustors and fuel manifolds.

The above description is meant to be exemplary only, and one skilled in the art will recognize that changes may be made to the embodiments described without department from the scope of the invention disclosed. For example, alternate configurations of the manifold support system and the fuel conveying members such as fuel manifolds and fuel nozzles can be used. The shared combustor and manifold locating device configurations depicted are preferred, but of course not necessary to achieve the function taught herein. Although described with respect to airborne gas turbines, the invention may be applied to any suitable engine in a suitable application. Still other modifications which fall within the scope of the present invention will be apparent to those skilled in the art, in light of a review of this disclosure, and such modifications are intended to fall within the appended claims.

The invention claimed is:

1. A combustor assembly for a gas turbine engine comprising an annular internal fuel manifold mounted to a combustor within the gas turbine engine by a common mounting system, the fuel manifold having at least one fuel conveying passage therein in fluid flow communication with a plurality of fuel injection nozzles disposed about the fuel manifold and adapted to spray fuel into the combustor, the mounting system supporting both the fuel manifold and the combustor within a surrounding gas generator casing such that the combustor is rigidly supported within the gas generator casing in an axial direction, the mounting system having a first support tube connecting the gas generator case to a combustor liner and permitting relative radial displacement between the fuel manifold and the combustor and the gas generator case such as to absorb any radial thermal growth differential therebetween.

2. The combustor assembly as defined in claim 1, wherein the mounting system includes at least three pin support assemblies equally spaced apart about the annular fuel manifold.

3. The combustor assembly as defined in claim 2, wherein each of said pin support assemblies includes:
    a combustor mounting flange fastened to an upstream end of the combustor liner, said upstream end of the combustor liner at least partially enclosing the fuel manifold;
    the first support tube extending radially inward from the gas generator casing and having an outer end fastened thereto, an inner end of the first support tube being mounted to the combustor mounting flange; and
    a second support tube disposed within the first support tube and being spaced inwardly therefrom, an outer end of the second support tube being fastened to the gas generator casing and an inner end of the second support tube locating a fuel inlet tube therewithin, the fuel inlet tube being spaced inwardly from the second support tube along a portion of a length thereof, an inner end of the fuel inlet tube being engaged with the fuel manifold and having a fuel inlet passage therein providing fuel flow communication with said at least one fuel conveying passage of the fuel manifold.

4. The combustor assembly as defined in claim 3, wherein the inner end of the first support tube is mounted to the combustor mounting flange by an angularly compliant joint.

5. The combustor assembly as defined in claim 4, wherein the angularly compliant joint includes a tubular bearing element disposed between the inner end of the first support tube and an opposed portion of the combustor mounting flange, the tubular bearing element having opposed convex side walls abutted each of said inner end of the first support tube and said opposed portion of the combustor mounting flange, such that relative angular displacement therebetween is permitted.

6. The combustor assembly as defined in claim 3, wherein the fuel inlet tube and the inner end of the second support tube are matingly engaged with each other such that sliding displacement therebetween is possible in a radial direction.

7. The combustor assembly as defined in claim 3, wherein the first support tube, the second support tube and the fuel inlet tube are concentrically disposed within one another.

8. The combustor assembly as defined in claim 3, wherein an annular air gap is defined between the first support tube and the second support tube.

9. The combustor assembly as defined in claim 8, wherein an annular air passage is defined between the second support tube and the fuel inlet tube along said portion of the length of the second support tube, said annular air passage receiving cooling airflow therein.

10. A mounting system for locating a combustor and a fuel manifold of a gas turbine engine within a gas generator casing thereof, the mounting system comprising at least three support pin assemblies which extend radially inwardly from the gas generator casing, the support pin assemblies supporting both the fuel manifold and at least an upstream end of the combustor and maintaining engagement between the fuel manifold and the combustor during operation of the gas turbine engine, wherein each of said pin support assemblies includes: a combustor mounting flange fastened to an upstream end of the combustor, said upstream end of the combustor at least partially enclosing the fuel manifold; and a first support tube extending radially inward from the gas generator casing and having an outer end fastened thereto, an inner end of the first support tube being mounted to the combustor mounting flange.

11. The mounting system as defined in claim 10, wherein the support pin assemblies include means for absorbing a thermal growth differential therebetween in at least a radial direction.

12. The mounting system as defined in claim 11, wherein said means for absorbing thermal growth differential provides axial constraint while permitting radial thermal expansion between the fuel manifold and the combustor.

13. The mounting system as defined in claim 10, wherein each of said pin support assemblies further includes:
   a second support tube disposed within the first support tube and being spaced inwardly therefrom, an outer end of the second support tube being fastened to the gas generator casing and an inner end of the second support tube locating a fuel inlet tube therewithin, the fuel inlet tube being spaced inwardly from the second support tube along a portion of a length thereof, an inner end of the fuel inlet tube being engaged with the fuel manifold and having a fuel inlet passage therein providing fuel flow communication with said at least one fuel conveying passage of the fuel manifold.

14. The mounting system as defined in claim 13, wherein the inner end of the first support tube is mounted to the combustor mounting flange by an angularly compliant joint.

15. The mounting system as defined in claim 14, wherein the angularly compliant joint includes a tubular bearing element disposed between the inner end of the first support tube and an opposed portion of the combustor mounting flange, the tubular bearing element having opposed convex side walls abutted each of said inner end of the first support tube and said opposed portion of the combustor mounting flange, such that relative angular displacement therebetween is permitted.

16. The mounting system as defined in claim 13, wherein the fuel inlet tube and the inner end of the second support tube are matingly engaged with each other such that sliding displacement therebetween is possible in a radial direction.

17. The mounting system as defined in claim 13, wherein the first support tube, the second support tube and the fuel inlet tube are concentrically disposed within one another.

18. The mounting system as defined in claim 13, wherein an annular air gap is defined between the first support tube and the second support tube.

19. The mounting system as defined in claim 13, wherein an annular air passage is defined between the second support tube and the fuel inlet tube along said portion of the length of the second support tube, said annular air passage receiving cooling airflow therein.

20. The mounting system as defined in claim 1, wherein the mounting system includes at least three pin support assemblies equally spaced apart about the annular fuel manifold.

* * * * *